United States Patent [19]

Keisler, Jr.

[11] Patent Number: 5,305,708
[45] Date of Patent: Apr. 26, 1994

[54] CONVERTIBLE AVIARY WITH SIDE NETTING

[76] Inventor: Clyde A. Keisler, Jr., 2510 Rolling Meadows Dr., Raleigh, N.C. 27603

[21] Appl. No.: 86,655

[22] Filed: Jul. 6, 1993

[51] Int. Cl.$^5$ .............................................. A01K 31/00
[52] U.S. Cl. ...................................................... 119/17
[58] Field of Search ..................... 119/17, 15, 19, 23; 135/100, 102, 106, 116, 120

[56] References Cited

U.S. PATENT DOCUMENTS

| | | | |
|---|---|---|---|
| 3,058,445 | 10/1962 | Johnson | 119/19 |
| 4,788,934 | 12/1988 | Fetter | 119/19 |
| 4,803,951 | 2/1989 | Davis | 119/19 |
| 5,078,096 | 1/1992 | Bishop et al. | 119/19 |

*Primary Examiner*—Gene Mancene
*Assistant Examiner*—Thomas Price
*Attorney, Agent, or Firm*—John G. Mills

[57] ABSTRACT

An indoor or quasi-indoor aviary for soft-bill and small hook-bill birds designed so as to permit the creation of both a miniature natural habitat and the illusion of an unenclosed space. The aviary features a lower frame that rests on a floor. Four removable corner supports extend vertically from each corner and provide support for an upper frame. Detachable netting connects to both the upper and lower frame and to a flexible lean-in, walk-in entryway. The top of the upper frame supports a removable upper cover. The sides of the upper frame support a built-in perch, an entry guide, vertical snap-on nesting poles and a horizontal brace extending across the top. The lower frame contains a feeding stand accommodating both peg-style and hanging-style feed and water containers. It also contains a plant rack with built-in holders for dried plant materials. Four legs lift the lower frame off the floor. A decorative upper band wraps around the upper frame. A decorative lower band that raises and lowers to allow removal of a litter tray wraps around the lower frame. The litter tray inserts into a disposable litter bag and slides under the lower frame. For those wishing to eliminate the removable corner supports, suspension cords attach to the upper frame and allow the aviary to be suspended from a structure above and external to the aviary.

20 Claims, 7 Drawing Sheets

FIG. 2

CONVERTIBLE AVIARY WITH SIDE NETTING

FIELD OF INVENTION

This invention relates to indoor aviaries that are designed for soft-bill and small hook-bill birds and specifically to aviaries that provide a safe, miniature natural habitat for enclosed birds.

BACKGROUND OF THE INVENTION

People who wish to enclose pet birds in their living or working areas face a difficult task providing a suitable flight environment. It is widely recognized that the preferred flight environment is one that complements the decor of the area in which it is placed, simulates a natural habitat, is safe and relatively large, provides a high degree of visibility, and creates an illusion of birds perching, flying and nesting in an unenclosed space. Consumer access to this "preferred flight environment" is limited due to five design factors found in current aviaries: visibility, safety, cost, space and aesthetics.

DISCUSSION OF THE PRIOR ART

One disadvantage of current aviaries is the use of metal and wood materials for walls and wall framing. These materials obstruct visibility of birds located in the enclosure and emphasize the enclosed nature of the bird habitat. As a result, both visibility and the illusion of an unenclosed space are greatly diminished.

Efforts to avoid the limitations imposed by wood and metal generally include designs using rigid translucent materials. While this design approach enhances visibility, it still encounters a second problem: the existence of rigid walls and internal supports. When a bird panics into flight and impacts rigid materials, whether translucent or opaque, it may suffer such problems as a broken neck, broken feathers, or a damaged cere (the enlarged fleshy area at the base of the bill). In this regard, the use of rigid translucent materials poses a greater safety threat than does the use of rigid opaque materials.

Flight environments made of rigid wall materials also encounter a problem of cost. Rigid translucent materials including glass and acrylic sheets are relatively expensive to produce and, because of weight, relatively expensive to ship. Similar cost factors are associated with the use of heavy opaque materials such as metal and wood. These production-transportation costs contribute to the relatively high price of most flight enclosures that are aesthetically suitable for indoor or quasi-indoor use.

These cost factors also limit the size of most flight enclosures. Ideally, an aviary should offer space sufficient to accommodate both active flight and the simulation of a miniature natural environment. For most soft-bills and small hook-bills, these uses translate into a minimum of forty cubic feet of space. Most furniture-quality aviaries, however, offer only twelve to twenty cubic feet of space.

Aviaries offering a minimum of forty cubic feet of space generally consist of rigid mesh wire panels. Such models are designed for commercial breeding operations and do not emphasize those aesthetic considerations that are of concern to consumers interested in furniture-quality designs.

BRIEF DESCRIPTION OF INVENTION

This invention incorporates a design that permits the creation of a miniature natural habitat that is highly visible, safe, spacious, aesthetically pleasing and relatively low cost. The design concept incorporates eight basic components. These include an upper frame; a lower frame; four removable corner supports connecting the upper and lower frames; suspended side netting; a walk-in entryway; a litter tray; decorative upper and lower bands and suspension cords. So as to enhance the illusion of an unenclosed space, the design of the aviary permits the corner supports to be removed and replaced by suspension cords that attach to and support the upper frame.

The upper frame supports a perch, a nesting pole, an entry guide and a brace that serves as an attachment point for hanging objects. The lower frame, which is supported by four legs, rests in a horizontal position under the upper frame. The forward half of the lower frame contains a plant rack supporting built-in holders for dried plant materials. An arched feeding stand attaches to the rear of the two sides of the lower frame. This stand supports peg-style feed and water containers.

Netting attaches to the perimeter of both the upper and lower frame. The netting hangs inside the four removable corner supports. Flexible rods thread vertically through the two selveged ends of the netting so as to form an entryway. The upper ends of the two rods insert into a piece of flexible tubing. The flexible tubing inserts into an entry guide located on the upper frame. The lower ends of the two rods insert into a piece of flexible tubing that inserts into an anchor located on the lower frame.

Removable decorative bands encircle the perimeter of the upper and lower frames. The lower band slides up allowing removal of a litter tray. For convenient cleaning, the litter tray includes a disposable litter bag.

The advantages of this design are multiple. The use of suspended flexible netting eliminates the need for rigid walls and increases the visibility of enclosed birds. The positioning of the corner supports outside the netted enclosure increases the safety of birds enclosed in the aviary. Also, the use of netting, particularly when combined with suspension of the upper frame, visually de-emphasize the enclosure to the point of appearing nearly invisible.

The existence of ample flight space combined with built-in holders for a variety of dried plant materials allow a miniature natural habitat to be created in the aviary. These features enhance the illusion of an unenclosed space.

Utilization of relatively inexpensive and easily assembled, lightweight materials minimizes production and transportation costs. Stretchable netting, in particular, lends itself to the creation of a relatively large and inexpensive flight space. Also, since some of the materials utilized in the aviary are readily available, consumers may obtain relatively inexpensive repair and replacement parts.

The walk-in entryway, the removable top, the disposable litter bag and the detachable netting permit the aviary to be conveniently cleaned and repaired. The seed deflector reduces the inconvenience of having to clean areas adjacent to the aviary.

In view of the above, it is an object of the present invention to provide an aviary for indoor and quasi-indoor use that accommodates both soft-bill and small hook-bill birds.

Another object of the present invention is to provide space sufficient for both active flight and the creation of a miniature natural environment consisting of dried grasses and perching trees.

Another object of the present invention is to provide a safe containment area which minimizes the possibility of injury to birds due either to impact with rigid materials or entanglement with multifiliment fibrous materials.

Another object of the present invention is to provide an aviary that, by utilizing lightweight inexpensive materials, can be manufactured, transported and marketed at minimal cost to consumers.

Another object of the present invention is to provide an aviary that enhances the visibility of birds contained within and, thereby, maximizes the illusion of an unenclosed space flight space.

Another object of the present invention is to provide an aviary that minimizes maintenance and cleaning requirements both in the aviary and in areas adjacent to the aviary.

Another object of the present invention is to provide an aviary that maximizes opportunities for customers to alter the external appearance and thereby customize the aviary so that it complements the decor of the area in which it is placed.

Another object of the present invention is to provide an aviary that is easily assembled and disassembled.

Further objects and advantages of my invention will become apparent from a consideration of the drawings and ensuing description both which are merely illustrative of the invention.

BRIEF DESCRIPTION OF THE DRAWINGS

FIG. 2 is a perspective view of the aviary showing the decorative upper and lower bands partially removed and the upper frame supported by suspension cords;

DETAILED DESCRIPTION OF INVENTION

Figure 1:
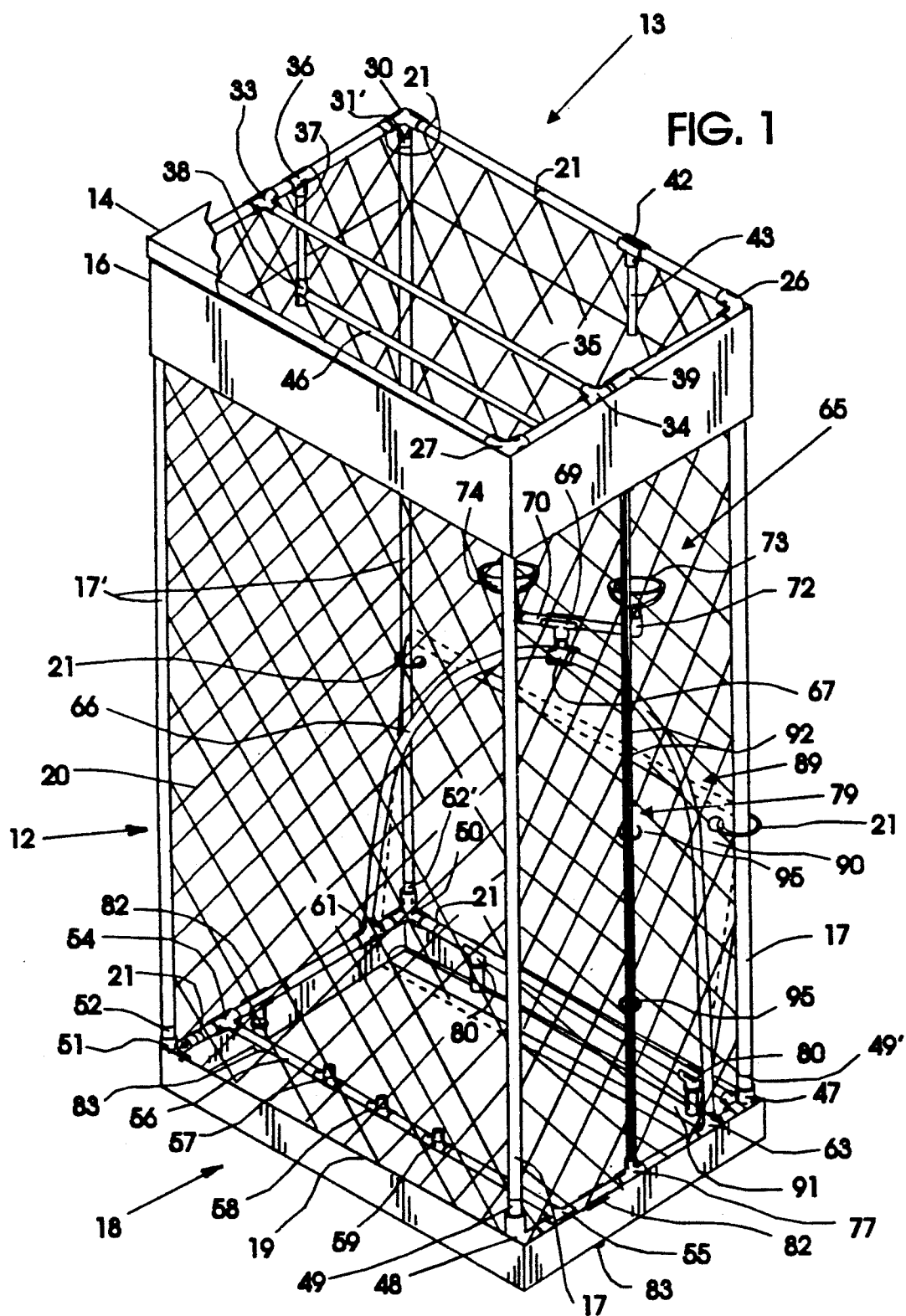
FIG. 1 is a cutaway perspective of the present invention.
Figure 3:
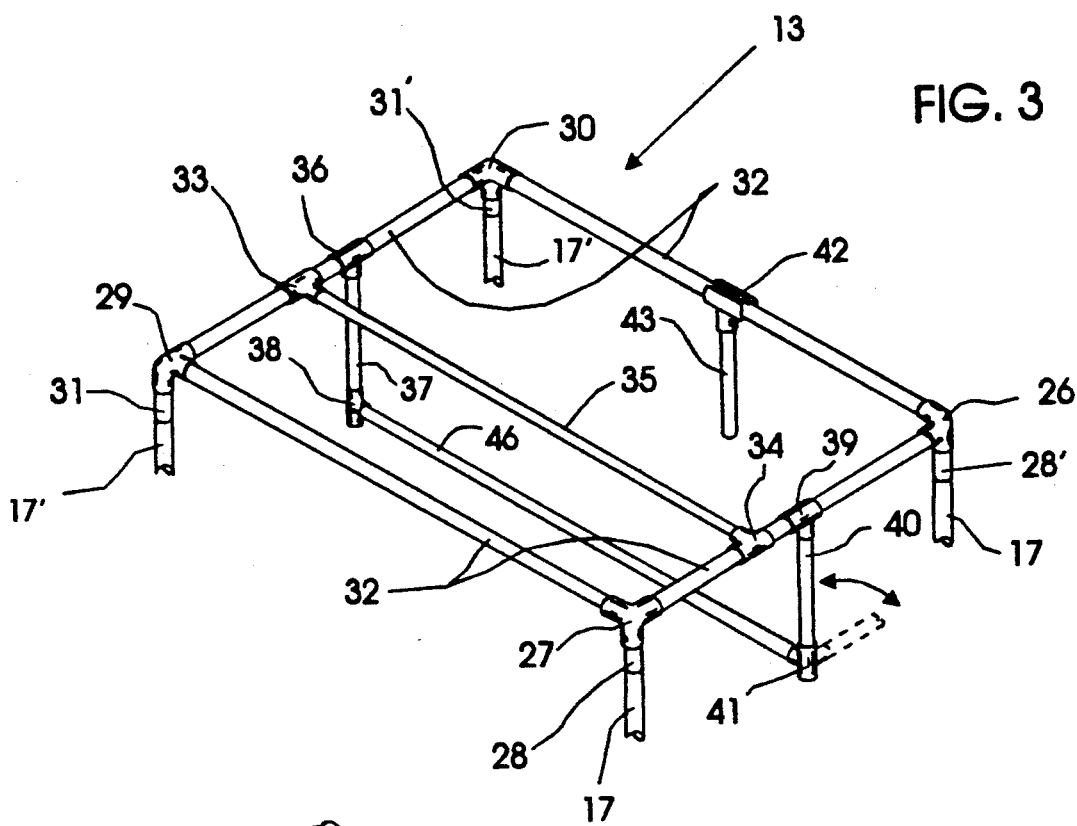
FIG. 3 is a perspective view of the upper frame.
Figure 4:
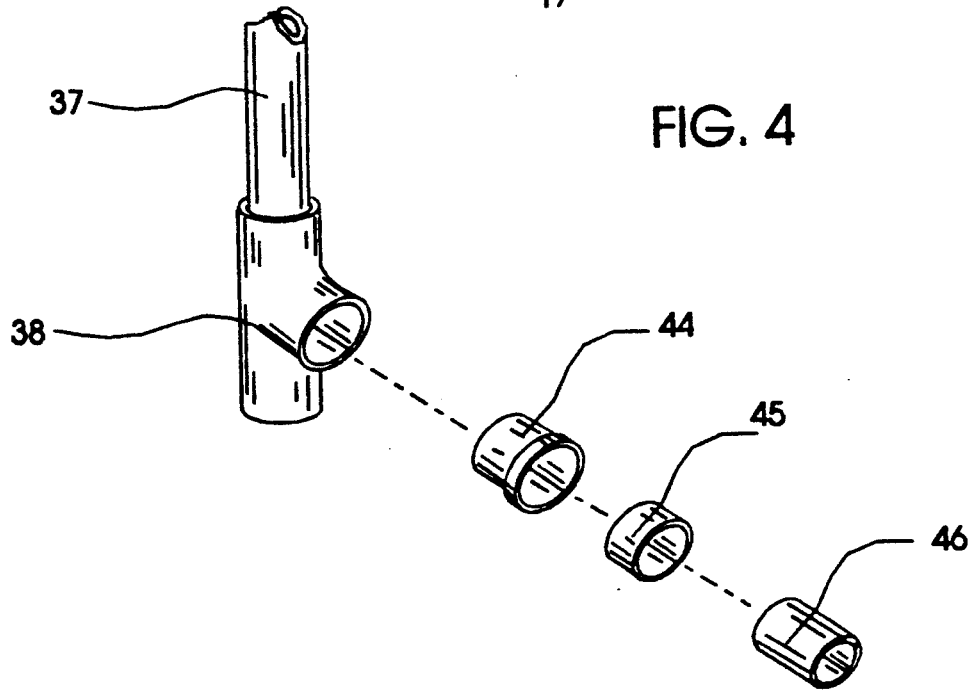
FIG. 4 is an exploded view of the lower end of the perch support.
Figure 5:
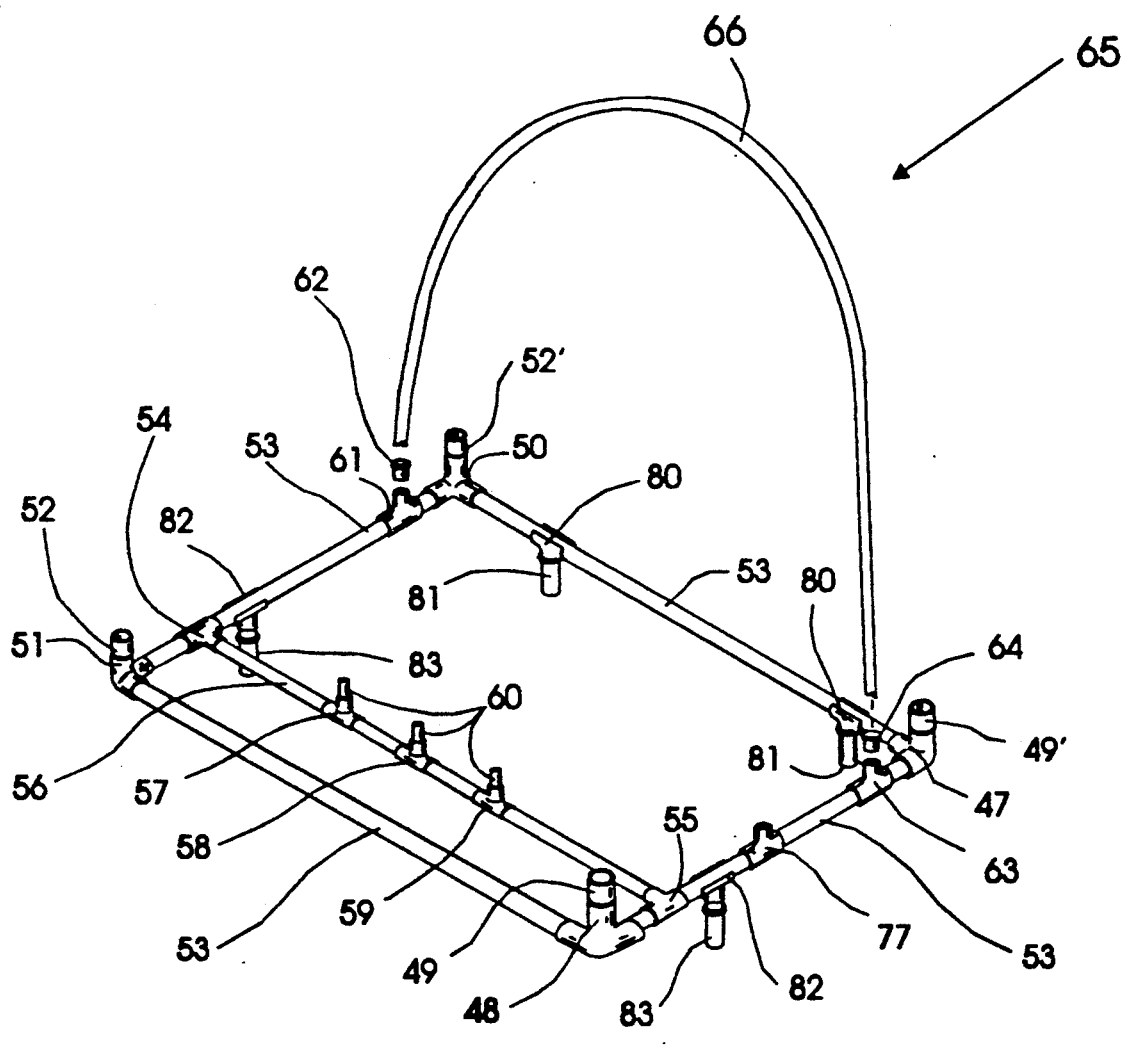
FIG. 5 is an exploded perspective view of the lower frame and plant rack.
Figure 6:
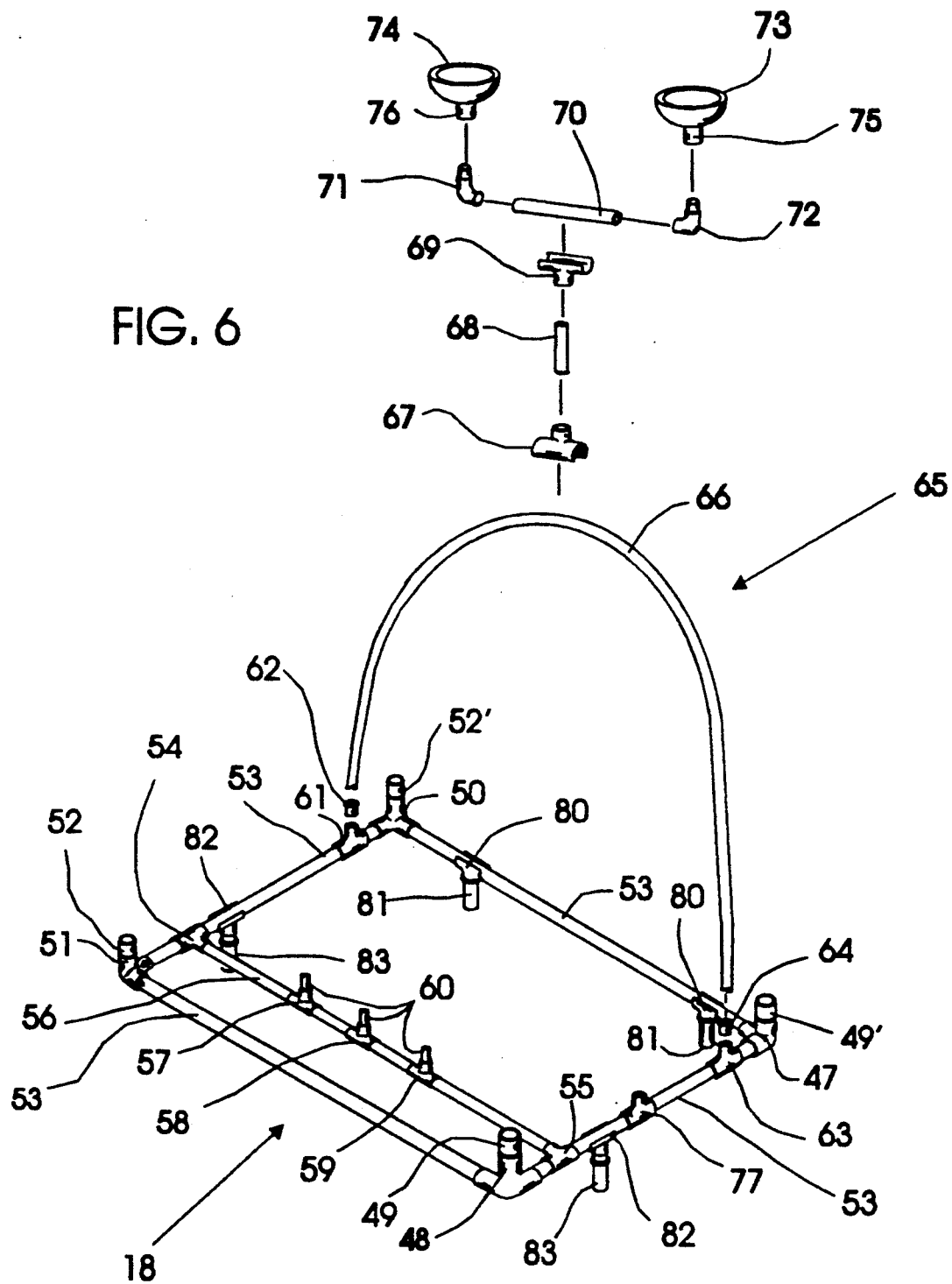
FIG. 6 is an exploded view of the feeding stand.
Figure 7:
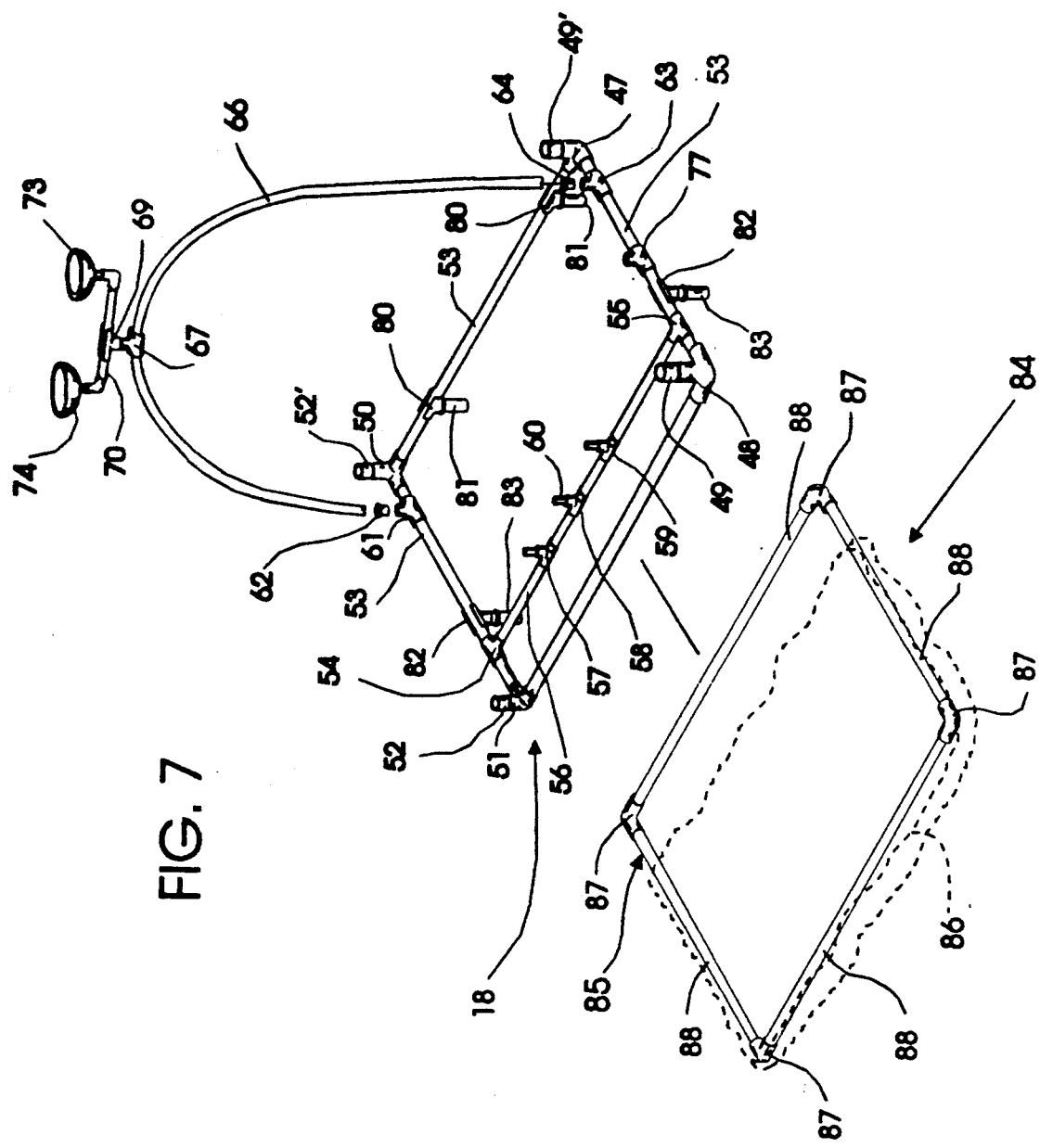
FIG. 7 is an exploded view of the litter tray, movable frame, litter bag and lower frame.
Figure 8:
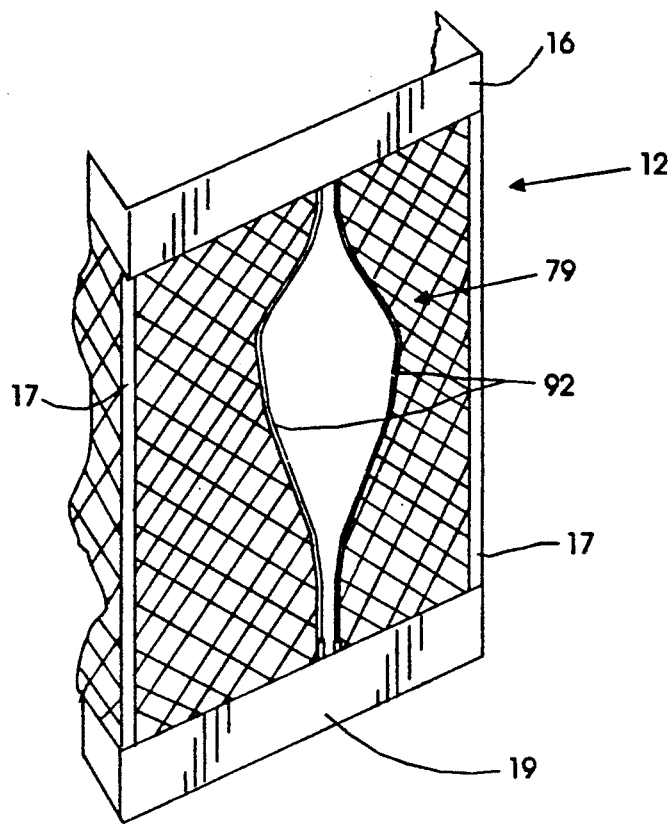
FIG. 8 is a fragmentary view of the aviary showing the flexible entryway in an opened position.
Figure 9:
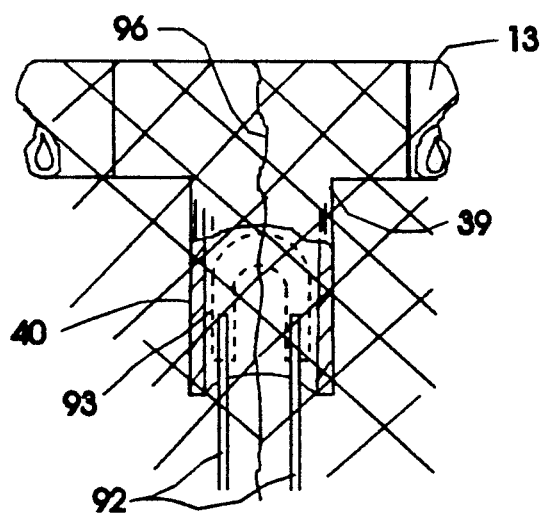
FIG. 9 is an enlarged fragmentary view of the entry guide with the flexible entryway fully inserted.

With further reference to the drawings, the aviary of the present invention, indicated generally at 12, includes an upper frame indicated generally at 13, an upper cover 14 removably secured on the upper frame and a decorative upper band 16 removably secured around the upper frame. A pair of removable corner supports 17 extends down from each corner on the right side of the upper frame to each corner on the right of a lower frame, indicated generally at 18. Similarly, a pair of removable corner supports 17' extends down from each corner on the left side of the upper frame to each corner on the left of the lower frame. A removable decorative lower band 19 encircles the lower frame. A detachable netting material 20 attaches to the perimeter of both upper frame 13 and lower frame 18. The netting material hangs inside the four corner supports. A plurality of fasteners 21 removably secures flexible netting material 20 to each Removal of fasteners 21 allows the netting to be detached for cleaning and replacement.

Figure 2:
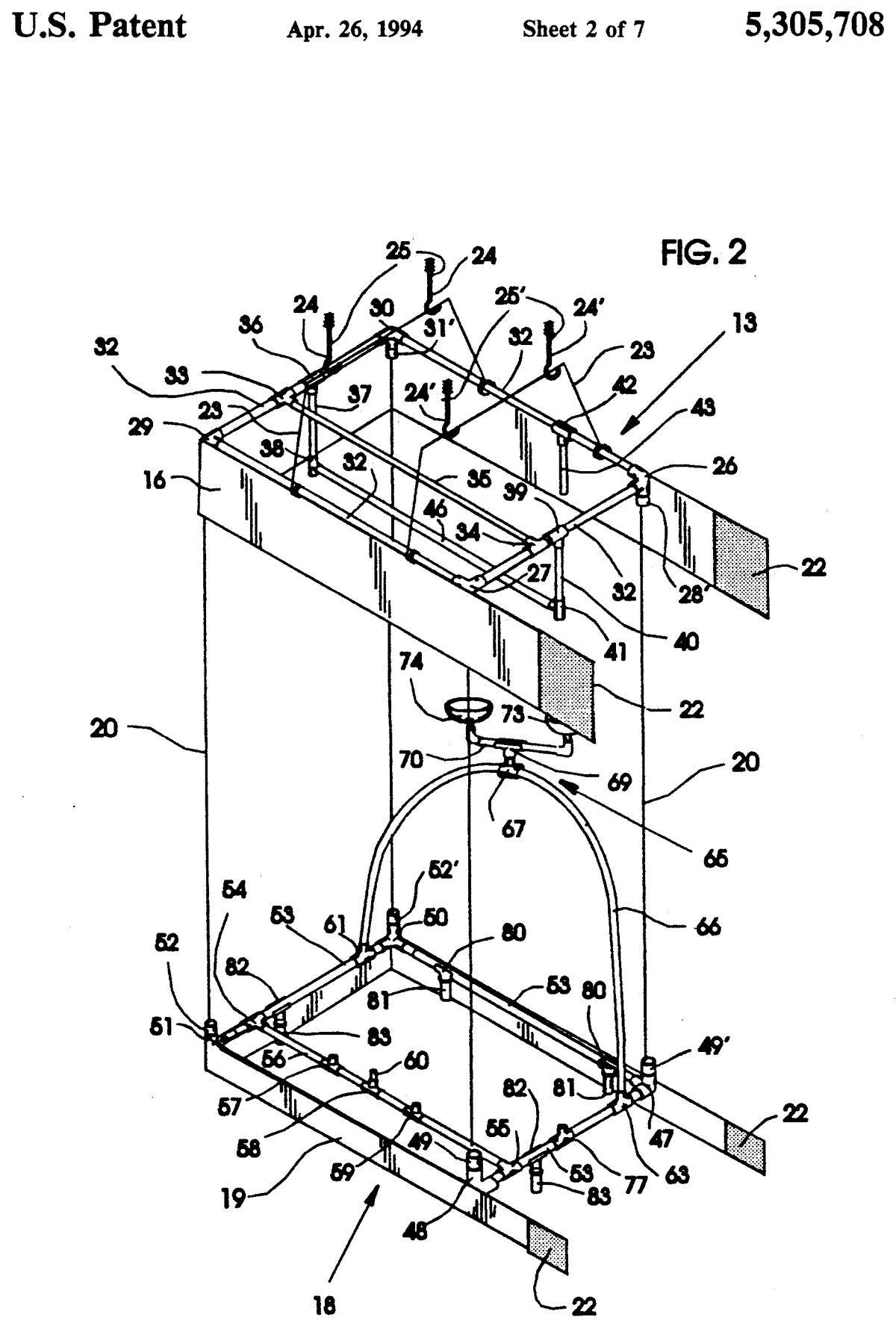

As is shown in FIG. 2, a hook-and-loop strip 22 located on each end of decorative upper band 16, allows the band to be fastened and unfastened as needed. In a similar fashion, hook-and-loop strip 22 located on each end of decorative lower band 19 allows it to be fastened and unfastened as needed.

When corner supports 17 and 17' are removed, upper frame 13 hangs in a horizontal position from a pair of suspension cords 23 that attaches to the front and rear sides of the upper frame. Each of these two cords hang from a pair of ceiling hooks 24 and 24'. The ceiling hooks screw into a pair of ceiling anchors 25 and 25'.

The right side of upper frame 13 includes a downward-facing side-outlet elbow 27 on the front of the frame and a downward-facing side-outlet elbow 26 on the rear. A screw-in adapter 28 inserts into side-outlet elbow 27. Similarly, a screw-in adapter 28' inserts into side-outlet elbow 26. The left side of the upper frame also includes a downward-facing side-outlet elbow 29 on the front of the frame and a downward-facing side-outlet elbow 30 on the rear. A screw-in adapter 31 inserts into side-outlet elbow 29. Similarly, a screw-in adapter 31' inserts into side-outlet elbow 30. These four side-outlet elbows join a set of four horizontal pieces of framing material 32. Removable corner supports 17 and 17' insert into the screw-in adapters and connect the upper frame to the lower frame.

A snap-on tee 33 with an inward-facing side-outlet clips on the forward left side of the upper frame. A snap-on tee 34 with an inward-facing side-outlet also clips on the forward right side of the upper frame. A top brace 35 inserts into each of these two snap-on tees.

A snap-on tee 36 with a downward-facing side-outlet clips on the center of the left side of the upper frame. The upper end of a perch support 37 inserts into snap-on tee 36. A snap-on tee 38 clips over the lower end of the perch support. A bushing 44 inserts into the inward-facing side-outlet of snap-on tee 38. This bushing serves as an insertion point for a coupling 45.

A snap-on tee 39 with a downward-facing side-outlet clips on the center of the right side of the upper frame. An entry guide 40 inserts into snap-on tee 39. A snap-on tee 41 clips on the end of the entry guide. One end of a perch 46 removably inserts into snap-on tee 41. The other end of perch 46 removably inserts into coupling 45.

A snap-on tee 42 clips on the right, rear section of the upper frame. This snap-on tee serves as an insertion point for a nesting pole 43.

The composition of lower frame 18 includes, on the right side, an upward-facing side-outlet elbow 47 on the rear of the frame and an upward-facing side-outlet elbow 48 on the front. A screw-in adapter 49 inserts into side-outlet elbow 48. Similarly, a screw-in adapter 49' inserts into side-outlet elbow 47. The left side of the lower frame also includes an upward-facing side-outlet elbow 50 on the rear of the frame and an upward facing side-outlet elbow 51 on the front. A screw-in adapter 52 inserts into side-outlet elbow 51. Similarly, a screw-in adapter 52' inserts into side-outlet elbow 50. These four side-outlet elbows join a set of four horizontal pieces of framing material 53. Removable corner supports 17 and 17' insert into the four screw-in adapters.

A snap-on tee 54 with an inward-facing side-outlet clips on the forward left side of the lower frame. Similarly, a snap-on tee 55 with an inward-facing side-outlet clips on the forward right side of the lower frame. A plant rack 56 inserts into each of these two snap-on tees.

Plant rack 56 serves as a support for three removable dried plant holders consisting of a snap-on tee 57, a snap-on tee 58 and a snap-on tee 59. A plant ring 60, that increases the height of the side-outlet, can insert into each of these snap-on tees.

A snap-on tee 61 with an upward-facing side-outlet clips on the rear left side of the lower frame. A bushing 62 inserts into this snap-on tee. A snap-on tee 63 with an upward-facing side-outlet also clips on the rear right side of the lower frame. A bushing 64 inserts into this snap-on tee.

A feeding stand, indicated generally at 65, includes an arch 66 that inserts into bushing 62 on the left side and bushing 64 on the right side. A snap-on tee 67, the side-outlet of which contains a coupling 68, clips on the top of the arch. The top of coupling 68 inserts into the side-outlet of a snap-on tee 69. An arm 70 then clips into the upper end of snap-on tee 69. An upward-facing elbow 71 on the left and an upward-facing elbow 72 on the right, slide over the ends of arm 70.

Elbow 72 serves as an anchor for a feeding bowl 73. Elbow 71 serves as an anchor for a watering bowl 74. A coupling 76 fixedly attaches to the bottom of watering bowl 74. In a similar fashion, a coupling 75 fixedly attaches to the bottom of feeding bowl 73. Each coupling removably inserts into its respective elbow.

Figure 10:
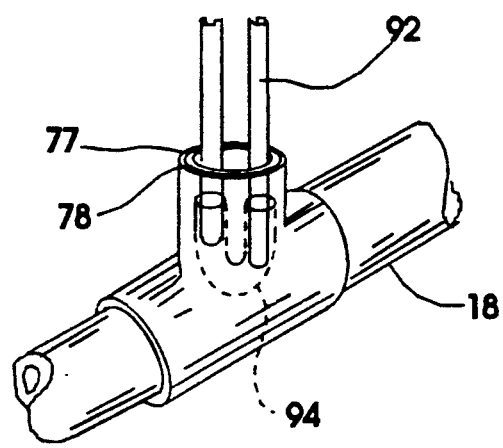
FIG. 10 is an enlarged fragmentary view of the lower end of the flexible entryway anchored to the lower frame.

A snap-on tee 77 clips on the center of the right side of the lower frame. As is shown in FIG. 10, a bushing 78 inserts into this snap-on tee. This snap-on tee serves as an anchor for the lower end of an entryway, indicated generally at 79.

A pair of fixedly secured snap-on tees 80 with downward-facing side-outlets clips on the rear of the lower frame. A pair of screw-in adapters 81 inserts into each of these snap-on tees. Similarly, a pair of fixedly secured snap-on tees 82 with downward-facing side-outlets clips on the front of the left and right sides of the lower frame. A pair of screw-in adapters 83 inserts into each of these snap-on tees. The four snap-on tees containing the screw-in adapters serve as legs that raise the aviary off the floor.

A litter tray, indicated generally at 84, slides under lower frame 18. The litter tray includes a movable frame, indicated generally at 85, that inserts into a detachable litter bag 86. The composition of movable frame 85 includes a set of four elbows 87 at each corner joining a set of four pieces of a framing material 88.

In FIG. 1, a seed deflector, indicated generally at 89, attaches outside the netted enclosure to the rear corner supports of the aviary. The seed deflector includes a sheet of flexible material 90 with a horizontal section of framing material 91 fastened to the lower end. Two fasteners 21 attach the top of seed deflector 90 to the rear corner supports. Framing material 91, fastens to the rear of lower frame 18 inside the netted enclosure.

Entryway 79 includes five components: a pair of flexible rods 92, a section of upper tubing 93, a section of lower tubing 94, a pair of lock rings 95, and an elastic cord 96.

Two flexible rods 92 constitute the main components of entryway 79. Each rod threads vertically through the selveged ends of the netting material. The upper end of each rod inserts into one end of upper tubing 93. In a similar fashion, the lower end of each rod inserts into one end of lower tubing 94. Once assembled, the upper end of the entryway inserts into entry guide 40. The lower end of the entryway inserts into bushing 78 located in snap-on tee 77. Elastic cord 96 threads through and seams the two ends of netting 20 above the entryway. Removable lock rings 95 secure the two flexible rods in a closed position.

Use of a fully assembled aviary involves a number of simple operations. Decorative upper band 16 wraps around upper frame 13 and fastens with hook-and-loop strips 22. In a similar fashion, decorative lower band 19 wraps tightly around lower frame 18 and fastens with hook-and-loop strips 22. When the two bands are unwrapped, fasteners 21 become removable. Removing these fasteners allows the netting to be detached for cleaning and replacement.

Snap-on tees 57, 58, and 59 slide on and off plant rack 58. When placed on the plant rack, the snap-on tees serve as containers for dried plant material. Plant ring 60 inserts into any plant holder which needs to be given a taller base.

Replacement of perch 46 involves rotating snap-on tee 41 located on the lower end of entry guide 40. When rotated to one side, the perch drops out of snap-on tee 41. One end of a new perch inserts into coupling 45 on the end of perch support 37. The other end inserts back into snap-on tee 41 located on the end of the entry guide.

Placement of a nesting basket or nesting box (not shown) involves using conventional double-sided mounting tape (not shown) to attach the basket or box to nesting pole 43. Once the nesting basket or box is attached, the upper end of nesting pole 43 inserts into the snap-on tee 42. The nesting pole may be placed at any location on the upper frame.

Use of the feeding stand 65 involves inserting feeding bowl 73 and watering bowl 74 into elbows 72 and 71 respectively. Each bowl, while removable, fits securely in its respective holder.

So as to minimize seed spillage, the top of the seed deflector attaches to the two rear corner supports while the bottom attaches inside the netted enclosure to the rear of the lower frame.

Entry into the aviary involves opening entryway 79. When in a closed position, flexible rods 92 stand upright and push upper tubing 93 into entry guide 40. Lock rings 95 keep the entryway in a closed position. Opening the lock rings allows the flexible rods to move outward and the upper tubing to slide down the entry guide. During opening and closing, the lower tubing remains anchored in snap-on tee 77.

Use of litter tray 84, which rests under lower frame 18, involves sliding decorative lower band 19 up and pulling the litter tray out from underneath the front of the aviary. For convenient cleaning, movable frame 85 slides out of detachable litter bag 86 and into a clean replacement bag. The cleaned litter tray subsequently slides back into position under lower frame 18. The decorative lower band slides back down to ensure complete enclosure of contained birds.

When the illusion of an unenclosed space needs to be maximized, the aviary converts from a floor model to a partially suspended model whereby the upper frame hangs from a pair of suspension cords. Converting to a partially suspended model involves five steps. These five steps include: attaching suspension cords 23 to both the left and right sides of upper frame 13, placing ceiling hooks 24 and 24' into ceiling anchors 25 and 25', placing the ceiling anchors into a ceiling, hanging the suspension cords from the ceiling hooks and removing the two pair of corner supports 17 and 17'.

Other embodiments will be obvious to those skilled in the art. Changes featured by other embodiments may include eliminating the four legs, resting the lower frame on the floor and removing the litter tray by raising the netting. Also, a combination of standard elbows and snap-on tees may substitute for the side-outlet elbows on the upper and lower frames. Finally, standard tees may substitute for the snap-on tees that serve as anchors for such attachments as the plant rack, the upper brace, and the feeding stand.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. An improved aviary comprising: a rigid upper frame; a rigid lower frame disposed in space relation below said upper frame; netting material disposed about said upper and lower frame and covering the space therebetween; means for securing said netting to said upper and lower frames; means for covering said upper frame; a litter tray removable mounted on said lower frame; a entryway in said netting; and support means connected to and disposed between said upper frame and said lower frame whereby an improved aviary with netted side walls is provided.

2. The aviary of claim 1, wherein said upper frame comprises a plurality of side-outlet elbows, each horizontal outlet of which joins to a section of framing material and each downward-facing side outlet of which contains a screw-in adapter.

3. The aviary of claim 2, including an entry guide of a predetermined size comprising a piece of framing material, the upper end of which inserts vertically into a snap-on tee that clips on said upper frame and the lower end of which joins to an inward-facing snap-on tee.

4. The aviary of claim 2, including a perch support of a predetermined size comprising a piece of framing material, the upper end of which inserts into a snap-on tee that clips on said upper frame and the lower end of which joins to a snap-on tee that contains a bushing into which is inserted a coupling.

5. The aviary of claim 2, including a perch wherein one end inserts into said coupling on the lower end of said perch support and the other end inserts into said snap-on tee on the lower end of said entry guide.

6. The aviary of claim 2, including a nesting pole comprising a piece of framing material that inserts into a snap-on tee that clips onto said upper frame.

7. The aviary of claim 1, wherein said lower frame comprises a plurality of side-outlet elbows with each horizontal outlet joining two sections of framing material and each upward-facing side-outlet containing a screw-in adapter.

8. The aviary of claim 7, further including a plant rack, each end of which inserts into a snap-on tee that clips on said lower frame.

9. The aviary of claim 8, including a plurality of plant holders comprising snap-on tees, whereby said plant holders serve as containers for dried plant material.

10. The aviary of claim 7, including a plurality of screw-in adapters that insert into a plurality of snap-on tees that clip on said lower frame, whereby said adapters and snap-on tees serve as legs that raise the aviary off the floor.

11. The aviary of claim 7, including a feeding stand comprising an arch that inserts into two bushings that insert into two snap-on tees that clip on said lower frame, with the top of said arch supporting a snap-on tee containing a coupling, the upper end of said coupling joining to a second snap-on tee in which rests an arm that supports two upward facing elbows.

12. The aviary of claim 11, including a feeding bowl and a watering bowl, each with a coupling attached to the bottom that inserts into one of said upward-facing elbows on said feeding stand.

13. The aviary of claim 1, including a plurality of removable corner supports the upper ends of which insert into said screw-in adapters on said upper frame and the lower ends of which insert into said screw-in adapters on said lower frame.

14. The aviary of claim 1, further including a seed deflector the upper end of which attaches to rear corner supports outside of said upper frame and the lower end of which attaches to the rear of said lower frame inside the netted aviary, whereby said seed deflector serves to minimize seed spillage into areas outside of said aviary.

15. The aviary of claim 1, wherein said entryway comprises a piece of upper tubing, a piece of lower tubing, and two flexible rods mounted therein.

16. The aviary of claim 1, wherein said litter tray comprises a frame with four elbows joining four pieces of framing materials thereby forming a movable frame that inserts into a detachable litter bag which may be discarded and replaced.

17. The aviary of claim 1, wherein said covering means comprises a sheet of material resting on said upper frame, whereby said covering means can be removed for purposes of cleaning.

18. The aviary of claim 1, including a decorative upper band of a predetermined length and width that stretches around the perimeter of said upper frame, whereby said decorative upper band provides both partial seclusion for roosting birds and alternative decorating options.

19. The aviary of claim 1, including a decorative lower band of a predetermined length and width that stretches around the perimeter of said lower frame, whereby said decorative lower band can be raised to allow removal of said litter tray.

20. An improved aviary comprising: a rigid upper frame; a rigid lower frame disposed in space relation below said upper frame; netting material disposed about said upper and lower frame and covering the space therebetween; means for securing said netting to said upper and lower frames; means for covering said upper frame; a litter tray removably mounted on said lower frame; an entryway in said netting; and a means for mounting said upper frame in suspension whereby an improved aviary with netted side walls is provided.

* * * * *